United States Patent
Liu et al.

(10) Patent No.: US 9,857,603 B2
(45) Date of Patent: Jan. 2, 2018

(54) 2D/3D SWITCHABLE DISPLAY DEVICE

(71) Applicant: Shenzhen China Star Optoelectronics Technology Co., Ltd., Shenzhen (CN)

(72) Inventors: Yawei Liu, Shenzhen (CN); Qiaosheng Liao, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 210 days.

(21) Appl. No.: 14/655,724

(22) PCT Filed: Apr. 1, 2015

(86) PCT No.: PCT/CN2015/075678
§ 371 (c)(1),
(2) Date: Jun. 26, 2015

(87) PCT Pub. No.: WO2016/115776
PCT Pub. Date: Jul. 28, 2016

(65) Prior Publication Data
US 2016/0306181 A1  Oct. 20, 2016

(30) Foreign Application Priority Data
Jan. 21, 2015  (CN) .......................... 2015 1 0031783

(51) Int. Cl.
*G02F 1/1335* (2006.01)
*G02B 27/22* (2006.01)
(Continued)

(52) U.S. Cl.
CPC ..... *G02B 27/2214* (2013.01); *G02B 27/2207* (2013.01); *G02F 1/133621* (2013.01);
(Continued)

(58) Field of Classification Search
CPC ............ G02B 27/2214; G02B 27/2207; G02F 1/133621
(Continued)

(56) References Cited

U.S. PATENT DOCUMENTS

2005/0254702 A1* 11/2005 Era ...................... H04N 13/026
                                                      382/154
2010/0097449 A1*  4/2010 Jeong ................ G02B 27/2214
                                                      348/59

FOREIGN PATENT DOCUMENTS

CN         1525212 A       9/2004
CN       101191606 A       6/2008

* cited by examiner

*Primary Examiner* — Lucy Chien
(74) *Attorney, Agent, or Firm* — Leong C. Lei

(57) ABSTRACT

The present invention provides a 2D/3D switchable display device, comprising a backlight module (2) and a liquid crystal panel (1) located on the backlight module (2); the liquid crystal panel (1) comprises a plurality of element images (11) sequentially aligned, and the backlight module (2) comprises a plurality of light-emitting elements (21) corresponding to the plurality of element images (11), and each light-emitting element (21) comprises a middle region (211) in a middle position and a surrounding region (212) at periphery of the middle region (211), and the middle regions (211) of the plurality of light-emitting elements (21) respectively correspond to the plurality of element images (11), and the middle region (211) and the surrounding region (212) are respectively controlled by different circuits to be lightened or dimmed; as the middle region (211) and the surrounding region (212) are lightened at the same time, the display device shows a 2D display mode, and as the middle region (211) is lightened and the surrounding region (212) is (Continued)

dimmed, the display device shows a 3D display mode of two dimensional integral imaging to achieve a switch of 2D/3D display modes.

14 Claims, 4 Drawing Sheets

(51) Int. Cl.
*G09G 3/32* (2016.01)
*G09G 3/00* (2006.01)
*G09G 3/36* (2006.01)

(52) U.S. Cl.
CPC .............. *G09G 3/003* (2013.01); *G09G 3/32* (2013.01); *G09G 3/36* (2013.01); *G02F 1/133602* (2013.01); *G02F 1/133603* (2013.01); *G02F 2001/133601* (2013.01); *G02F 2001/133626* (2013.01); *G02F 2201/52* (2013.01); *G02F 2202/02* (2013.01)

(58) Field of Classification Search
USPC .......................................................... 349/14
See application file for complete search history.

2D/3D SWITCHABLE DISPLAY DEVICE

FIELD OF THE INVENTION

The present invention relates to a display technology field, and more particularly to a 2D/3D switchable display device.

BACKGROUND OF THE INVENTION

The Integral Imaging technology is developed from the Integral Photography proposed by the French scientist, M. G. Lippmann in 1908. The basic principle is divided into a collection stage and an image reconstruction stage. The collection stage is to utilize the two dimensional parallax barrier or the two dimensional lens array to record the space scene in the medium behind the two dimensional parallax barrier or the two dimensional lens array. Each of the two dimensional parallax barrier or the two dimensional lens array corresponds to one element image (EI) on the medium behind, and each element image records a part of information of the space scene. The element image array, which is constituted by integrating all the element images records the three dimensional information of the entire space scene. The image reconstruction stage is based on the principle of reversibility of light. The same two dimensional parallax barrier or two dimensional lens array as recording is located in front of the element image array. Accordingly, the original three dimensional space scene is reconstructed before the two dimensional parallax barrier or the two dimensional lens array.

Please refer to FIG. 1. FIG. 1 is an imaging principle diagram of an integral imaging 3D display system. The integral imaging 3D display system comprises a collection system 110 and a display system 120. The collection system 110 comprises a image collection sensor 400 and a first two dimensional parallax barrier 300. The display system 120 comprises a liquid crystal panel 401 and a second two dimensional parallax barrier 301.

In the collection stage, the object 500 is positioned in front of the first two dimensional parallax barrier 300. The lights emitted from the object 500 pass through the plurality of slits of the first two dimensional parallax barrier 300 and are transferred to the image collection sensor 400. The image collection sensor 400 records the lights passing through every slit of the first two dimensional parallax barrier 300 corresponded with an element image of forming the object 500. Ultimately, the image collection sensor 400 obtains the lights passing through all slits of the first two dimensional parallax barrier 300 corresponded with a plurality of element image of forming the object 500, of which the parallaxes are different to construct the element image array. Thus, the information collection to the object 500 is accomplished.

In the image reconstruction stage, the captured element image array is shown on the liquid crystal panel 401, and the second two dimensional parallax barrier 301 which is the same as the first two dimensional parallax barrier 300 is overlapped before or after the liquid crystal panel 401. Accordingly, based on the principle of reversibility of light, the image 501 of the collected object 500 is reconstructed by the second two dimensional parallax barrier 301. The reconstructed image 501 can provide the anaglyphs of different directions, and combine with the parallax combination property of human eyes. People can see the 3D effect of the object 500 without glasses, which is so called the naked eye 3D.

Please refer to FIG. 2. FIG. 2 is a structural diagram of an integral imaging 3D display device according to prior art. The integral imaging 3D display device comprises a liquid crystal panel 100, a backlight module 200 located under the liquid crystal panel 100, and a two dimensional parallax barrier 600 located between the liquid crystal panel 100 and the backlight module 200, wherein the two dimensional parallax barrier 600 also can be located on the liquid crystal panel 100.

After the uniform surface light source provided by the backlight module 200 pass through the two dimensional parallax barrier 600, the different pixels of the liquid crystal panel 100 emit lights toward different directions after the lights shine on the liquid crystal panel 100 because the light possesses directionality. With the reasonable designs to the slit apertures of the two dimensional parallax barrier 600 and the image shown by the liquid crystal panel 100, the observer can see the anaglyphs of different angles in the x direction and the y direction shown in FIG. 2. Thus, the integral imaging display can be achieved.

However, the integral image 3D display device according to prior art can only achieve the 3D effect display but no switch of the 2D/3D display mode is possible. Therefore, there is a need to develop a 2D/3D switchable display device to solve the aforesaid issue.

SUMMARY OF THE INVENTION

An objective of the present invention is to provide a 2D/3D switchable display device, which can achieve the free switch of the two dimensional and the three dimensional display modes. The structure is simple and easy more manufacture.

For realizing the aforesaid objective, the present invention provides a 2D/3D switchable display device, comprising a backlight module and a liquid crystal panel located on the backlight module;

the liquid crystal panel comprises a plurality of element images sequentially aligned, and the backlight module comprises a plurality of light-emitting elements corresponding to the plurality of element images, and each light-emitting element comprises a middle region in a middle position and a surrounding region at periphery of the middle region, and the middle regions of the plurality of light-emitting elements respectively correspond to the plurality of element images, and the middle region and the surrounding region are respectively controlled by different circuits to be lightened or dimmed;

as the middle region and the surrounding region are lightened at the same time, the display device shows a 2D display mode, and as the middle region is lightened and the surrounding region is dimmed, the display device shows a 3D display mode of two dimensional integral imaging to achieve a switch of 2D/3D display modes.

The backlight module employs white light OLEDs.

The element image appears to be square.

The light-emitting element appears to be square.

The middle region appears to be square.

The element image comprises 9 pixels which are aligned to appear as 3 pixels×3 pixels.

The plurality of element images respectively show two dimensional images of a three dimensional object recorded from different angles, and the plurality of element images construct an element image array.

The element image array contains three dimensional information of the three dimensional object.

The present invention further provides a 2D/3D switchable display device, comprising a backlight module and a liquid crystal panel located on the backlight module;

the liquid crystal panel comprises a plurality of element images sequentially aligned, and the backlight module comprises a plurality of light-emitting elements corresponding to the plurality of element images, and each light-emitting element comprises a middle region in a middle position and a surrounding region at periphery of the middle region, and the middle regions of the plurality of light-emitting elements respectively correspond to the plurality of element images, and the middle region and the surrounding region are respectively controlled by different circuits to be lightened or dimmed;

as the middle region and the surrounding region are lightened at the same time, the display device shows a 2D display mode, and as the middle region is lightened and the surrounding region is dimmed, the display device shows a 3D display mode of two dimensional integral imaging to achieve a switch of 2D/3D display modes;

wherein the backlight module employs white light OLEDs;

wherein the element image appears to be square.

The benefits of the present invention are: the 2D/3D switchable display device of the present invention employs liquid crystal panel as an optical modulation layer, and employs the white light OLEDs as the backlight module. The liquid crystal panel comprises a plurality of element images sequentially aligned, and the backlight module comprises a plurality of light-emitting elements corresponding to the plurality of element images, and each light-emitting element comprises a middle region in a middle position and a surrounding region controlled by different circuits; by showing element images of the three dimensional object on the liquid crystal panel, and meanwhile lightening the middle position and the surrounding region of the backlight module at the same time, the effect equivalent to an uniform surface light source is formed to achieve 2D display; by showing element images of the three dimensional object on the liquid crystal panel, and meanwhile lightening the middle position and dimming the surrounding region of the backlight module, the pattern light source effect equivalent to an uniform surface light source and the two dimensional parallax barrier is formed to generate anaglyphs of different directions to achieve 3D display, and accordingly, to achieve the free switch of the two dimensional and the three dimensional display modes. The structure is simple and easy more manufacture.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
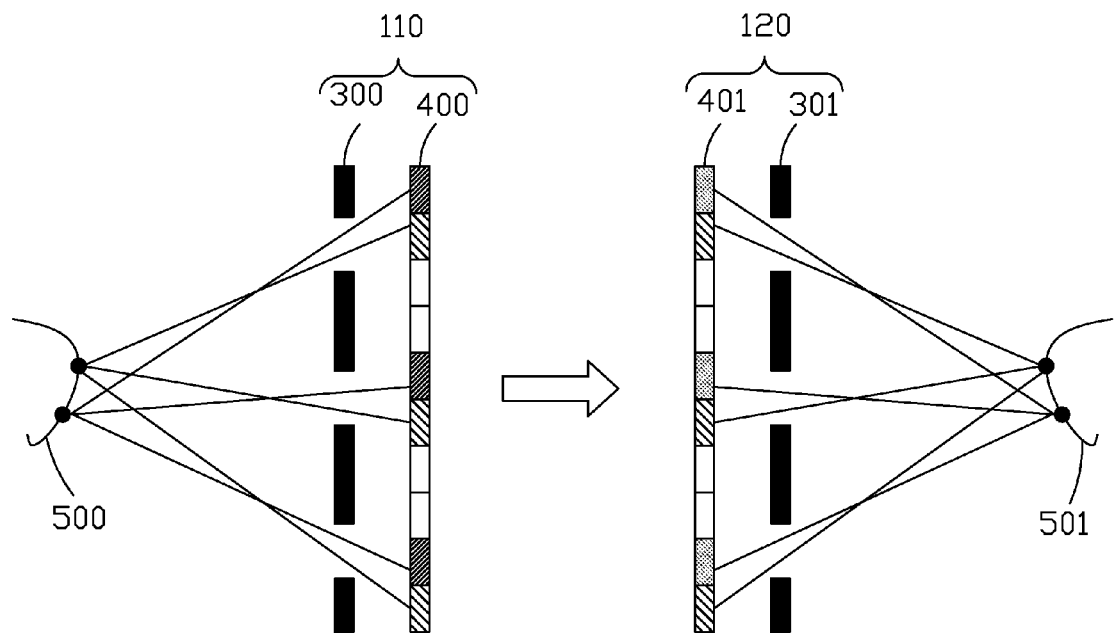
FIG. 1 is an imaging principle diagram of an integral imaging 3D display system.
Figure 2:
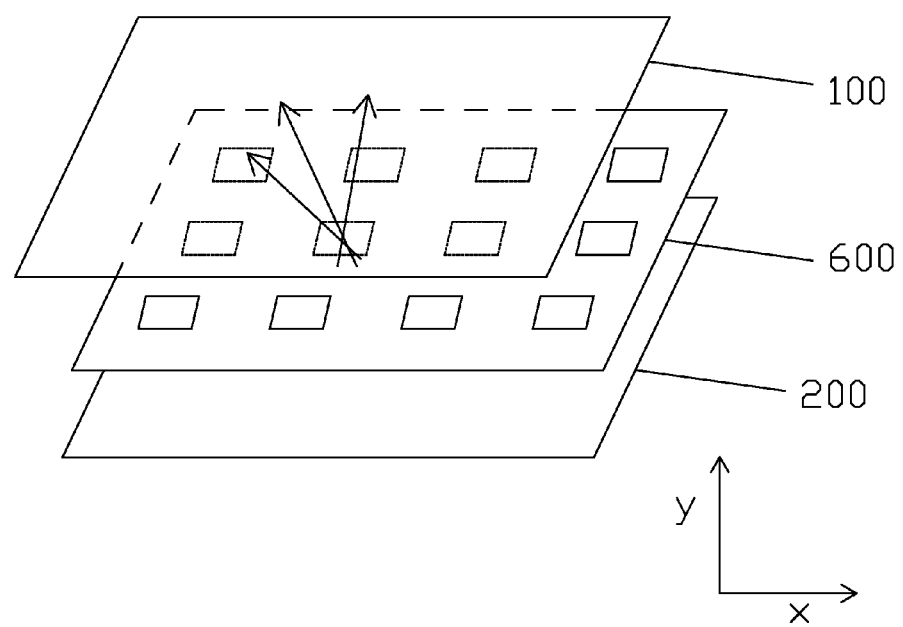
FIG. 2 is a structural diagram of an integral imaging 3D display device according to prior art.
Figure 3:
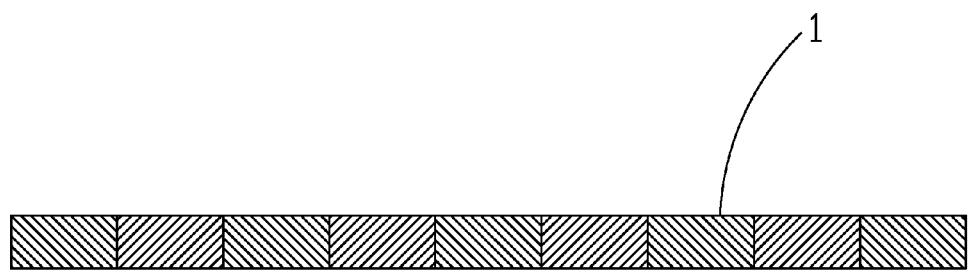
FIG. 3 is a structural diagram of an 2D/3D switchable display device according to the present invention.
Figure 3:
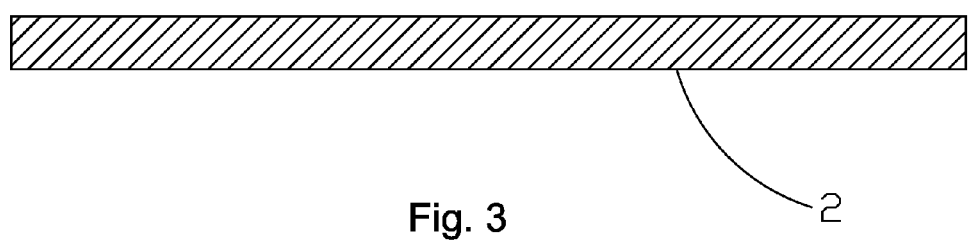
Figure 4:
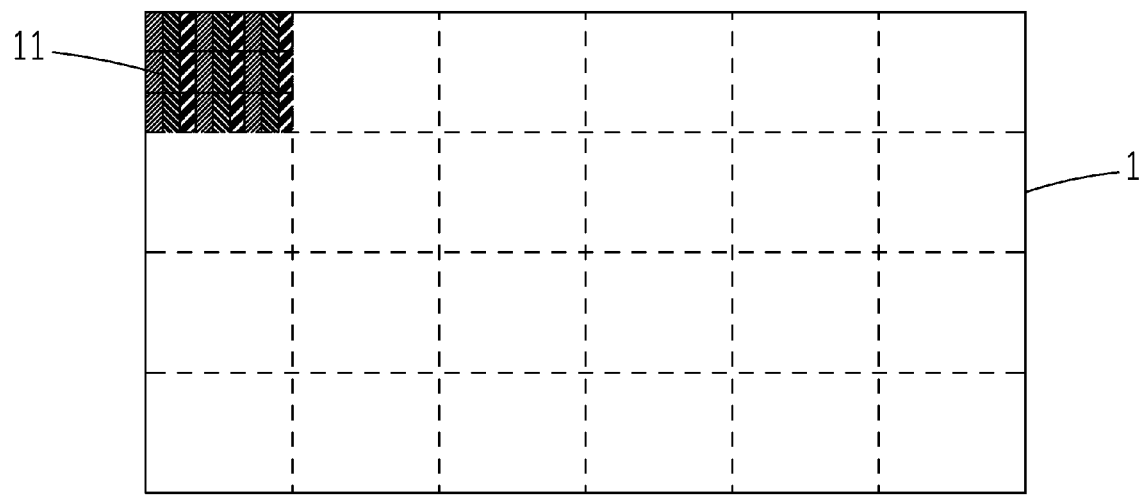
FIG. 4 is a structural diagram of a liquid crystal panel in the 2D/3D switchable display device according to the present invention.
Figure 5:
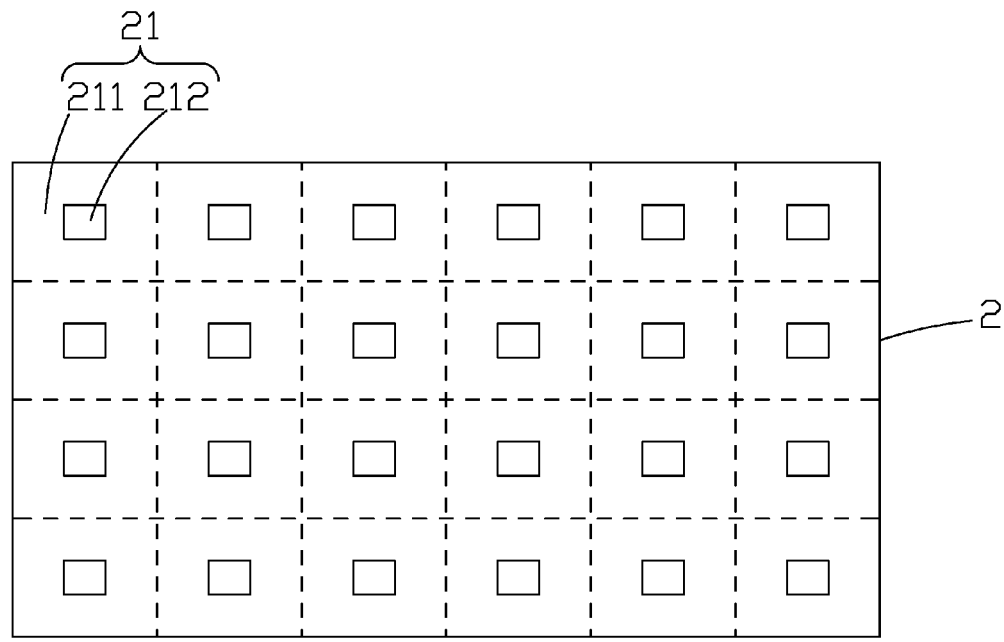
FIG. 5 is a structural diagram of a backlight module in the 2D/3D switchable display device according to the present invention.

Please refer from FIG. 3 to FIG. 5, together. The present invention provides a 2D/3D switchable display device, comprising a backlight module 2 and a liquid crystal panel 1 located on the backlight module 2.

The liquid crystal panel 1 is employed as an optical modulation layer. Preferably, the backlight module 2 employs white light OLEDs.

Please refer to FIG. 4 and FIG. 5, together. The liquid crystal panel 1 comprises a plurality of square element images 11 sequentially aligned, and each element image 11 comprises 9 pixels which are aligned to appear as 3 pixels×3 pixels, wherein each pixel comprises a red, a green and a blue sub pixels. The backlight module 2 comprises a plurality of square light-emitting elements 21 corresponding to the plurality of element images 11.

Specifically, each light-emitting element 21 comprises a middle region 211 in a middle position and a surrounding region 212 at periphery of the middle region 211, and the middle regions 211 of the plurality of light-emitting elements 21 respectively correspond to the plurality of element images 11.

The middle region 211 and the surrounding region 212 are respectively controlled by different circuits to be lightened or dimmed.

As the 2D/3D switchable display device of the present invention works, the plurality of element images 11 of the liquid crystal panel 1 respectively show two dimensional images of a three dimensional object recorded from different angles, and the plurality of element images 11 construct an element image array. Specifically, the element image array of the three dimensional object can be collected by the present skills and processed with the present two dimensional image process method. Ultimately, the element image array is shown by the liquid crystal panel 1, and the element image array contains three dimensional information of the three dimensional object.

As the middle region 211 and the surrounding region 212 are lightened at the same time, the backlight module 2 provides an uniform surface light source to the liquid crystal panel 1. The liquid crystal panel 1 shows a two dimensional image and the display device shows a 2D display mode.

Figure 6:
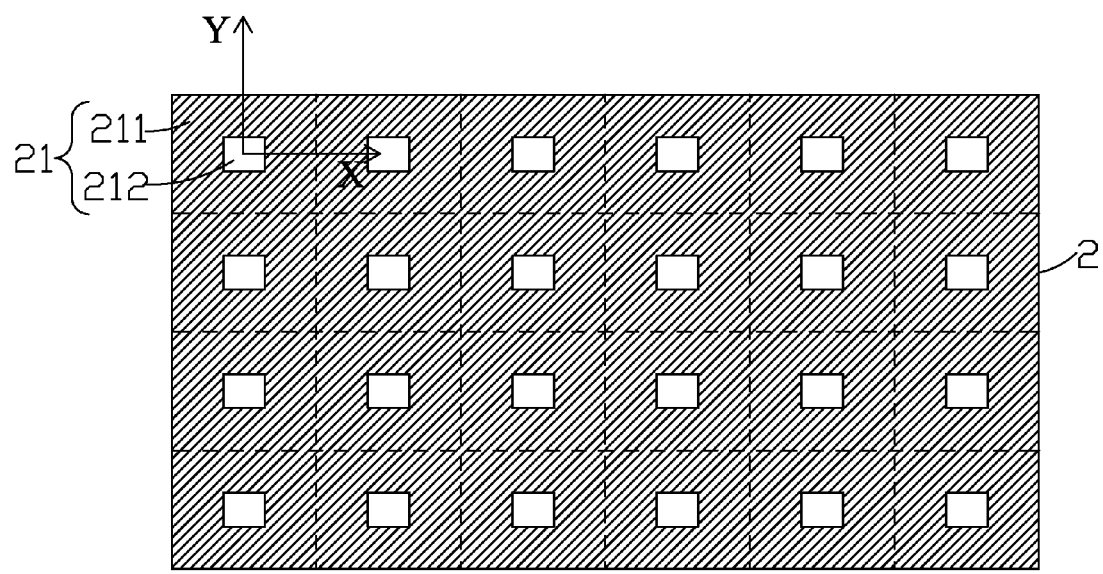
FIG. 6 is a diagram of the light-emitting elements of the backlight module as the 2D/3D switchable display device according to the present invention is in 3D display mode.
Figure 7:
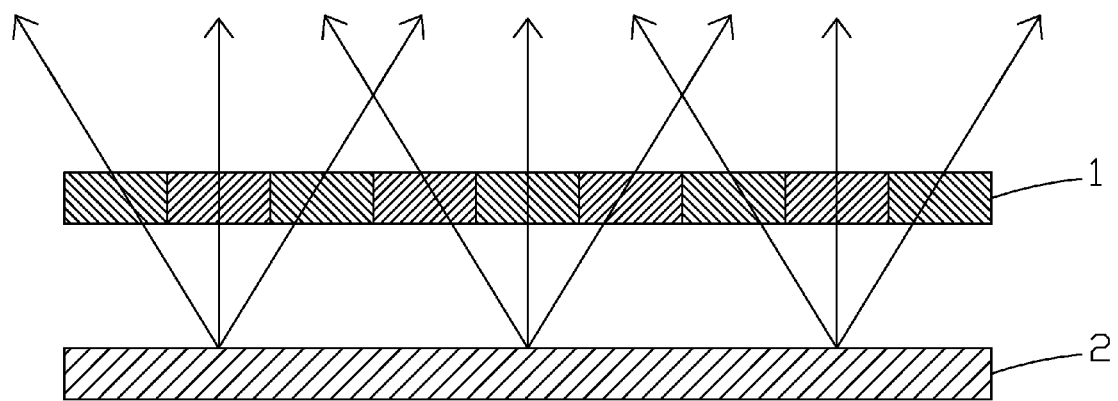
FIG. 7 is a light path diagram as the 2D/3D switchable display device according to the present invention is in 3D display mode.

Please refer to FIG. 6 and FIG. 7, as the middle region 211 is lightened and the surrounding region 212 is dimmed, the backlight module 2 provides the pattern light source equivalent to an uniform surface light source overlapping the two dimensional parallax barrier to the liquid crystal panel 1.

As shown in FIG. 7, the lights emitted from the backlight module 2 respectively progress toward the liquid crystal panel 1 with different angles. The different pixels of the liquid crystal panel 1 forward lights to different directions. Therefore, the observer can see the anaglyphs of different angles in the x direction and the y direction. Thus, the 3D display mode of two dimensional integral imaging can be achieved.

When it is demanded to switch back to the 2D display mode from the 3D display mode, only the surrounding region 212 of the backlight module 2 is lightened, the 2D display mode can be realized to achieve a switch of 2D/3D display modes.

In conclusion, the 2D/3D switchable display device of the present invention employs liquid crystal panel as an optical modulation layer, and employs the white light OLEDs as the backlight module. The liquid crystal panel comprises a plurality of element images sequentially aligned, and the backlight module comprises a plurality of light-emitting elements corresponding to the plurality of element images, and each light-emitting element comprises a middle region in a middle position and a surrounding region controlled by different circuits; by showing element images of the three dimensional object on the liquid crystal panel, and meanwhile lightening the middle position and the surrounding region of the backlight module at the same time, the effect equivalent to an uniform surface light source is formed to achieve 2D display; by showing element images of the three dimensional object on the liquid crystal panel, and meanwhile lightening the middle position and dimming the surrounding region of the backlight module, the pattern light source effect equivalent to an uniform surface light source and the two dimensional parallax barrier is formed to generate anaglyphs of different directions to achieve 3D display, and accordingly, to achieve the free switch of the two dimensional and the three dimensional display modes. The structure is simple and easy more manufacture.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A 2D/3D switchable display device, comprising a backlight module and a liquid crystal panel located on the backlight module;
   the liquid crystal panel comprises a plurality of element images sequentially aligned, and the backlight module comprises a plurality of light-emitting elements corresponding to the plurality of element images, and each light-emitting element comprises a middle region in a middle position and a surrounding region at periphery of the middle region, and the middle regions of the plurality of light-emitting elements respectively correspond to the plurality of element images, and the middle region and the surrounding region are respectively controlled by different circuits to be lightened or dimmed;
   as the middle region and the surrounding region are lightened at the same time, the display device shows a 2D display mode, and as the middle region is lightened and the surrounding region is dimmed, the display device shows a 3D display mode of two dimensional integral imaging to achieve a switch of 2D/3D display modes.

2. The 2D/3D switchable display device according to claim 1, wherein the backlight module employs white light OLEDs.

3. The 2D/3D switchable display device according to claim 1, wherein the element image appears to be square.

4. The 2D/3D switchable display device according to claim 1, wherein the light-emitting element appears to be square.

5. The 2D/3D switchable display device according to claim 1, wherein the middle region appears to be square.

6. The 2D/3D switchable display device according to claim 1, wherein the element image comprises 9 pixels which are aligned to appear as 3 pixels×3 pixels.

7. The 2D/3D switchable display device according to claim 1, wherein the plurality of element images respectively show two dimensional images of a three dimensional object recorded from different angles, and the plurality of element images construct an element image array.

8. The 2D/3D switchable display device according to claim 7, wherein the element image array contains three dimensional information of the three dimensional object.

9. A 2D/3D switchable display device, comprising a backlight module and a liquid crystal panel located on the backlight module;
   the liquid crystal panel comprises a plurality of element images sequentially aligned, and the backlight module comprises a plurality of light-emitting elements corresponding to the plurality of element images, and each light-emitting element comprises a middle region in a middle position and a surrounding region at periphery of the middle region, and the middle regions of the plurality of light-emitting elements respectively correspond to the plurality of element images, and the middle region and the surrounding region are respectively controlled by different circuits to be lightened or dimmed;
   as the middle region and the surrounding region are lightened at the same time, the display device shows a 2D display mode, and as the middle region is lightened and the surrounding region is dimmed, the display device shows a 3D display mode of two dimensional integral imaging to achieve a switch of 2D/3D display modes;
   wherein the backlight module employs white light OLEDs;
   wherein the element image appears to be square.

10. The 2D/3D switchable display device according to claim 9, wherein the light-emitting element appears to be square.

11. The 2D/3D switchable display device according to claim 9, wherein the middle region appears to be square.

12. The 2D/3D switchable display device according to claim 9, wherein the element image comprises 9 pixels which are aligned to appear as 3 pixels×3 pixels.

13. The 2D/3D switchable display device according to claim 9, wherein the plurality of element images respectively show two dimensional images of a three dimensional object recorded from different angles, and the plurality of element images construct an element image array.

14. The 2D/3D switchable display device according to claim 13, wherein the element image array contains three dimensional information of the three dimensional object.

* * * * *